United States Patent [19]

Ochs et al.

[11] Patent Number: 4,578,001
[45] Date of Patent: Mar. 25, 1986

[54] AIR CONVEYING HOPPER

[75] Inventors: Charles S. Ochs, Lancaster; Harold L. Siler, Rockbridge, both of Ohio

[73] Assignee: Anchor Hocking Corporation, Lancaster, Ohio

[21] Appl. No.: 220,960

[22] Filed: Dec. 29, 1980

[51] Int. Cl.[4] .............................................. B65G 53/40
[52] U.S. Cl. ....................... 406/10; 198/392; 198/396; 221/278; 406/52; 406/77; 406/88
[58] Field of Search ....................... 406/10, 32, 52, 77, 406/79, 86, 88; 198/380, 392, 396, 443, 444, 493; 221/278; 294/64 A, 64 B

[56] References Cited

U.S. PATENT DOCUMENTS

| | | | |
|---|---|---|---|
| 2,631,714 | 3/1953 | McCain | 198/392 X |
| 3,185,285 | 5/1965 | Runco et al. | 198/573 X |
| 3,209,888 | 10/1965 | Sterling | 198/396 X |
| 3,285,387 | 11/1966 | Ochs | 198/392 X |
| 3,752,294 | 8/1973 | Harmon | 198/392 |
| 4,002,254 | 1/1977 | Olopsen | 294/64 B |
| 4,074,830 | 2/1978 | Adams et al. | 221/278 X |

*Primary Examiner*—Jeffrey V. Nase
*Attorney, Agent, or Firm*—Stoll, Wilkie, Previto & Hoffman

[57] ABSTRACT

An improved mechanism is disclosed for receiving a supply of randomly oriented articles and for continuously feeding the articles into a single file line in a feed chute. The mechanism includes a rotating disc within a hopper with a series of air vents positioned around the disc edge for directing streams of air over the disc top to engage the articles and to cause the articles to move with the moving disc surface towards and into a single line feed chute.

6 Claims, 7 Drawing Figures

AIR CONVEYING HOPPER

BACKGROUND OF THE INVENTION

The present invention relates to a method and means for feeding articles from a supply of randomly oriented articles to a single file feed chute which carries the articles to an article utilizing device such as a closure cap assembly machine for composite closure caps or a similar machine. More particularly, this invention discloses a device particularly adapted for feeding non-magnetic rings such as molded plastic rings from a feed hopper to a feed chute using a rotating feed disc with air nozzles or vents positioned on the disc to engage and carry the rings with the rotating disc.

There are a number of composite articles which include non-magnetic rings where the completed article is formed by combining each ring with an additional member such as a metallic disc. One article of this general type which is used in enormous quantities, for example, is a composite closure cap of the type used for sealing containers. They consist of an outer plastic ring which mounts a central metallic or other cover portion. During the automatic assembly of such rings and covers, it is desirable to feed the rings one at a time into an assembly machine where the covers are positioned into the rings to complete the closures. The mechanism of the present invention carries the rings from a supply of randomly positioned rings in a feed hopper to a chute which feeds the individual rings in a line to an assembly machine for the assembly or other operation.

A number of hoppers of this general type are well known for use in feeding generally circular closure caps to container sealing or other machines. Such a feeder is illustrated, for example, in U.S. Pat. No. 3,185,285 issued on May 25, 1965, and owned by the assignee of this invention. A hopper of the type illustrated in this patent is useful with metallic closures. Another hopper is illustrated in U.S. Pat. No. 3,285,387 issued on Nov. 15, 1966 and also owned by the assignee of present invention. The hopper of this second patent is useful with non-magnetic articles where the articles are essentially discs or hollow articles which may be engaged by vacuum forces.

The hopper of the present invention provides a novel means for handling ring-like articles which are non-metallic and which do not adapt themselves to engagement by vacuum forces. The plastic rings described below are a typical example of articles which are handled by a hopper in accordance with the present invention.

The mechanism of this invention includes a generally circular rotating disc mounted with a hopper. The rings are fed from a conveyor or other supply means into the hopper where they are engaged by the rotating disc. In order to cause the plastic rings to be engaged and moved by the disc, a series of air nozzles or vents are provided around the disc edge. Streams of air are directed out and across the disc surface to engage and carry the rings into a feed chute. The chute receives the rings and carries them in a single line into a ring orienting or other ring utilizing means.

Accordingly an object of the present invention is to provide an improved feed hopper particularly useful with non-magnetic articles such as ring-like articles.

Another object of the present invention is to provide a feed hopper utilizing air streams for engaging articles within the hopper.

Another object of the present invention is to provide a feed hopper useful with non-magnetic rings.

Another object of the present invention is to provide an improved feed hopper for use with non-magnetic articles.

Another object of the present invention is a relatively simple and effective high speed feed hopper for non-magnetic articles including ring-like alrticles.

Other and further objects of the present invention will become apparent upon an understanding of the illustrative embodiments about to be described, or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 6 is a top plan view of a molded plastic ring of the type handled by the hopper of the invention.

FIG. 7 is a vertical sectional view of the air vents on the disc taken along line 7—7 on FIG. 3.

DESCRIPTION OF THE PREFERRED EMBODIMENT

Figure 1:
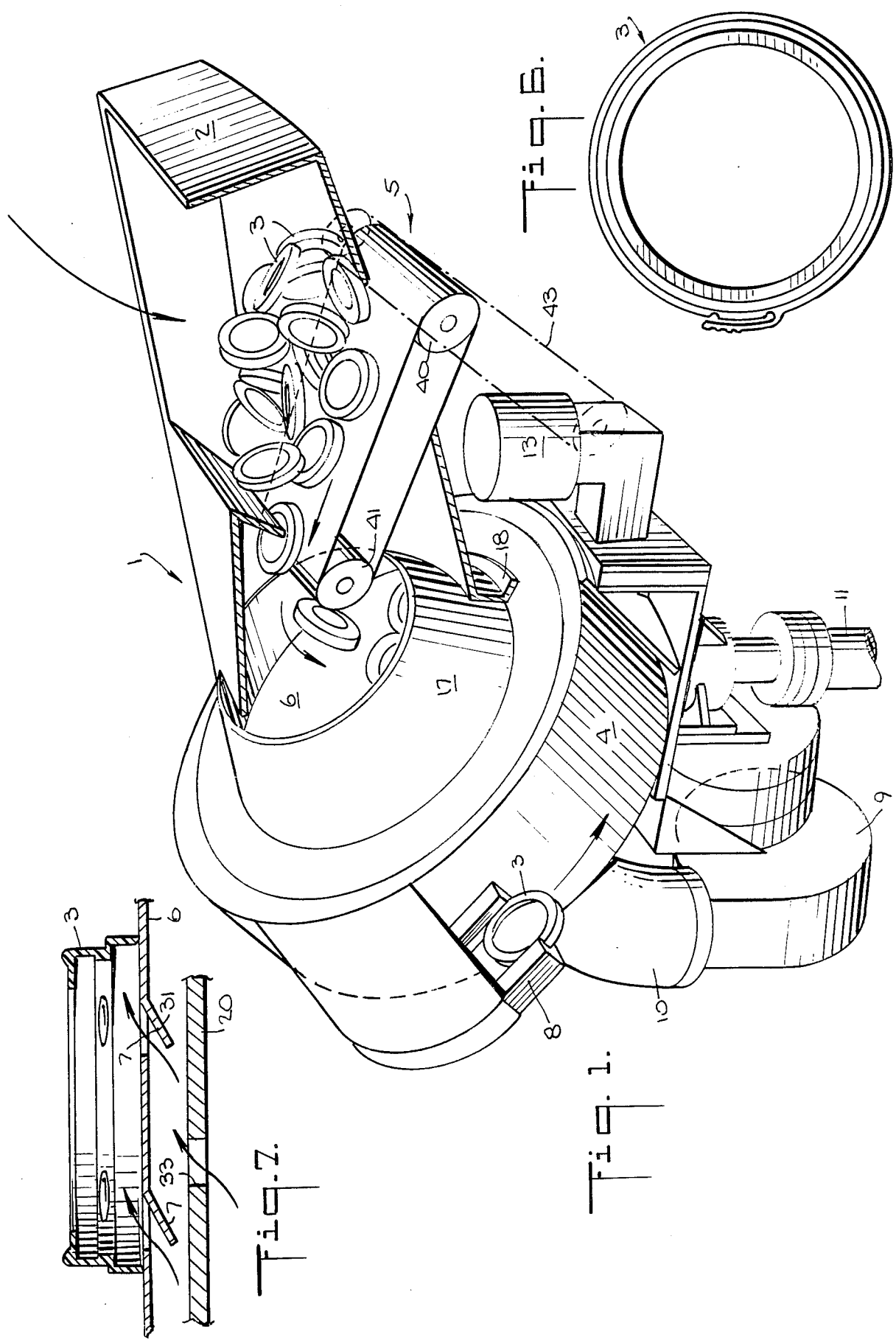
FIG. 1 is a perspective view of a preferred embodiment of the hopper in accordance with the present invention.
Figure 3:
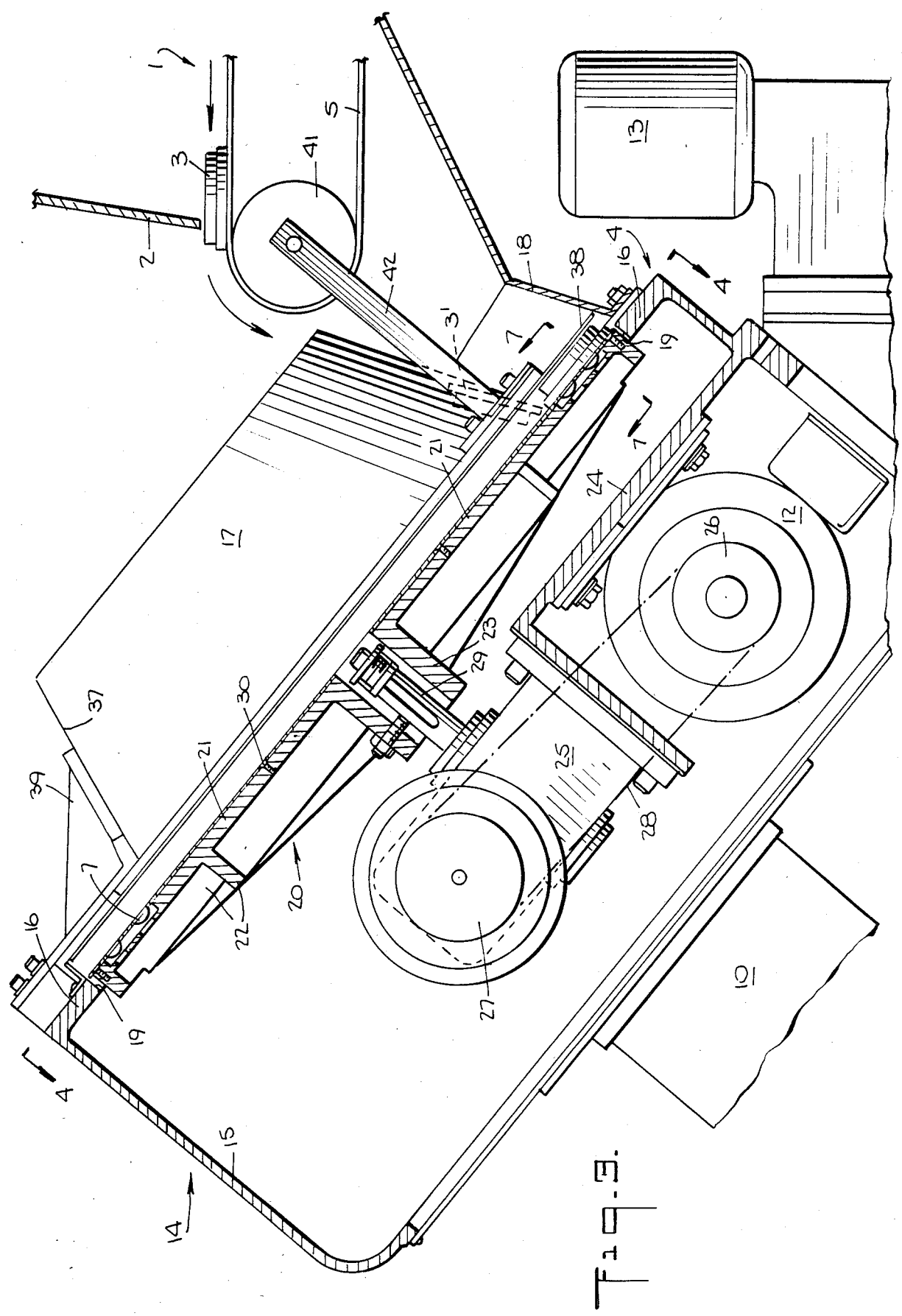
FIG. 3 is a vertical sectional view of the hopper taken along line 3—3 on FIG. 2.

Referring to the drawing and more particularly to FIG. 1, a preferred hopper assembly is illustrated in accordance with the present invention. The hopper assembly 1 includes an open topped feed bin 2 which receives the ring-like aritcles 3 which are fed into a hopper 4 by means of a feed conveyor 5. The feed conveyor 5 is controlled by a sensing device, as described below, which is activated by the absence of articles 3 within the hopper 4 to activate the conveyor 5 to move the articles 3 from the bin 2 into the hopper 4. A rotating disc 6 is mounted within the hopper 4. The rotating disc 6 provides a bottom support for the articles 3 within the hopper 4 and air nozzles or vents 7 in the disc 6 carry the article 3 upwardly within the hopper 4 to a chute or outlet 8. The articles or rings 3 pass outwardly through the outlet chute 8. The outlet chute 8 may include a selecting device which detects the position of each ring 3 within the chute 8 to determine whether its top is uppermost and it may either reject inverted rings or invert them so that all rings are properly oriented at the end of the chute 8. The inverter is not part of the present invention. The nozzle or vents 7 in the rotating disc 6 are supplied with air by means of a blower 9 and an air conduit 10 coupled to the bottom of the hollow hopper 4. The entire assembly is moutned on a suitable support post 11. Suitable electric motors 12 and 13 are provided for the conveyor 5 and the rotating disc 6 respectively as illustrated in FIG. 3.

The hopper 4 will now be described in greater detail with particular reference to FIGS. 2 through 7. The hopper 4 has a hollow housing 14 which may be conveniently molded from metal or plastic to have the general cross sectional shape illustrated in FIG. 3. The housing 14 includes generally cylindrical side walls 15 and a top flange 16 provided for mounting a hollow funnel member 17 and the bin support 18. An opening 19 is provided in the outer surface of the housing 14 in which the disc 6 is positioned.

Figure 4:
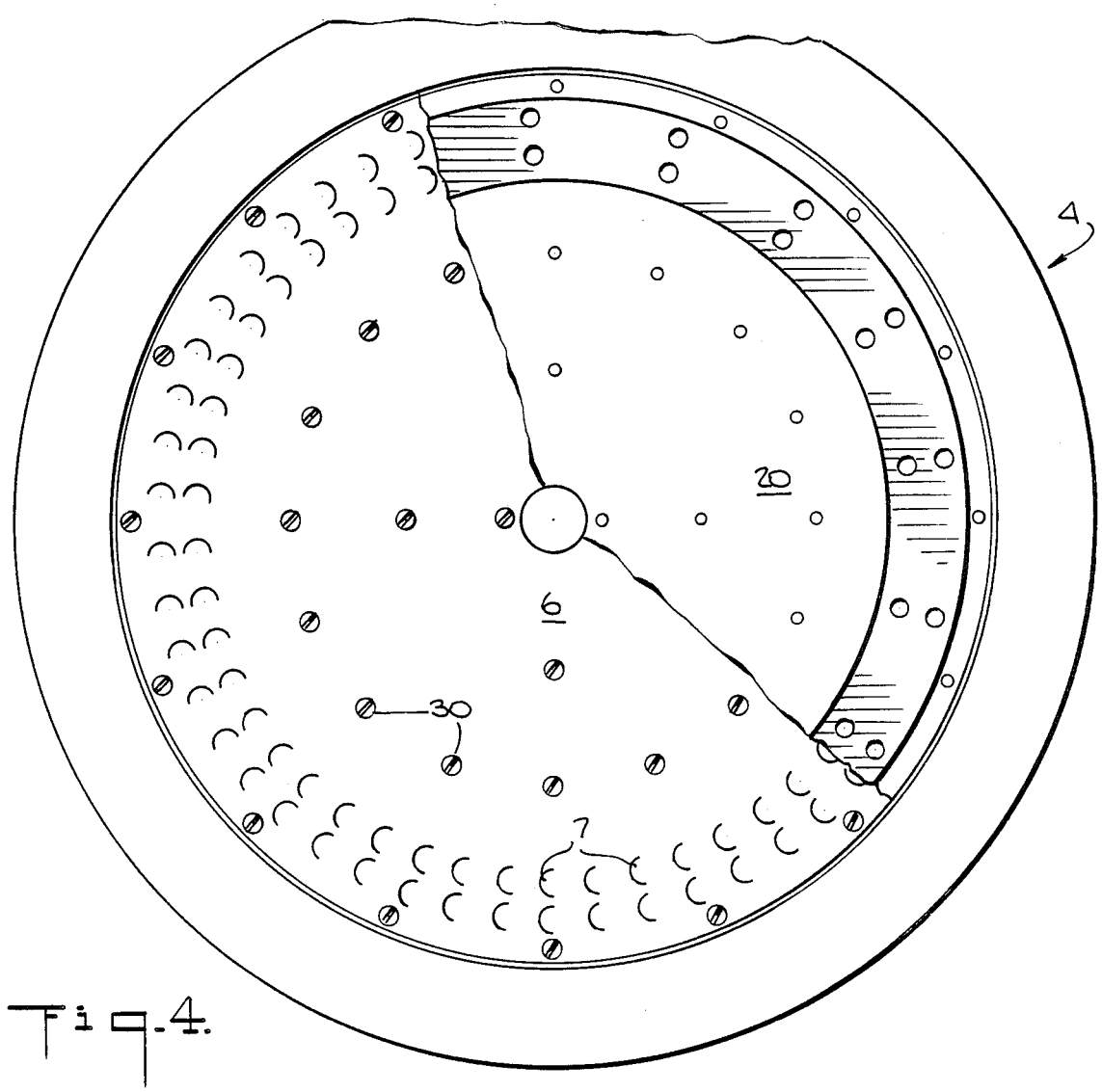
FIG. 4 is a top plan view, partially cut away, of the disc and disc enclosure.
Figure 5:
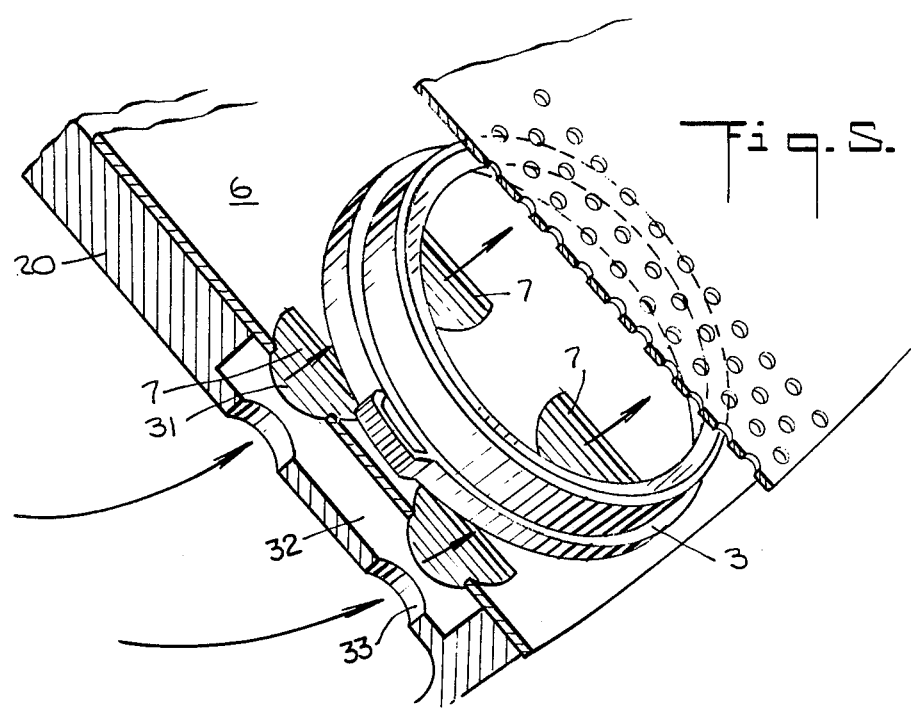
FIG. 5 is an enlarged detailed perspective view of the disc transporting a ring-like article.

The circular article conveying disc 6 is mounted with its upper surface at the top of the hopper 4 on a spider 20. The spider 20 has an upper disc mounting flange 21 and a number of radially directed and circular stiffening members 22 positioned outwardly of a central hub 23. A mounting flange 24 is formed intergally with the hopper 4 to support the disc drive motor 12 which is coupled to the spider hub 23 through the intermediation of a right angle drive 25, pullys 26 and 27, and a drive belt 28. The output shaft 29 of the drive 25 is positioned so that the spider 20 supports the disc 6 at the surface of the housing 4. As illustrated in FIG. 4, the circular disc 6 is attached to the top flange 21 of the spider 20 by suitable fastenings 30. The series of air vents or nozzles 7 are provided in an annular zone around the outer portion of the disc 6. A preferred arrangement provides a number of vents 7 positioned to insure that one or more vents 7 direct a stream of air outwardly against the rings 3 as the lower most rings 3 within the hopper housing 14 rest on the rotating disc 6.

The preferred embodiment illustrated has two circular rows of vents 7 with the individual vents 7 spaced relatively closely together, as for example, about one ring 3 radius between adjacent vents 7. An effective and simple means to form the vent or nozzle 7 comprises punched semi-circular openings of the general form illustrated in FIGS. 4 and 5. Each of the punchings comprises a semi-circular cut portion 31 which is bent downwardly and positioned so that air passes upwardly through the vent in the general direction of the disc 6 rotation. An annular slot 32 is provided in the top of the spider 20 with a series of air holes 33 formed in the bottom of the slot 32 permitting air to pass from the hopper housing 14 outwardly through the spider 20 then to the above described air vents or nozzles 7 in the rotating disc 6.

The air emerging from vents 7 under some pressure flows generally circumferentially and in the direction of the disc 6 rotation so that it strikes the generally vertical sides of the rings 3 which are adjacent to the disc 6 within the housing 14. The air pressure causes the rings 3 to advance as the disc 6 rotates and causes the rings 3 to pass tangentially from the disc 6 surface into the chute entrance illustrated at 8 in FIG. 2. As already indicated, a selector which is not part of present invention, may be employed for orienting the rings 3 within the chute 8. The rings 3 are moved through the chute 8 by a combination of feed pressure as additional rings are moved into the chute 8 from the disc 6 as well as by gravity.

The action of the air vents 7 and the rotating disc 6 is facilitated by a rotating wiper blade 34 mounted on a bracket 35 in the center of the disc 6. Projecting soft rubber rods or similar elements 36 rotate with the disc 6 to urge the rings 3 within the hopper 4 to move with the disc 6 and downwardly to the disc surface in the above described ring feeding action. The downwardly flaring funnel member 17 is provided above the rotating disc 6 for assisting in the entry of the rings 3 into the hopper housing 14 and in directing the rings 3 during the above described feeding action. The funnel 17 includes the flared portion 37 and a radially directed flange portion 38 which is attached to the outer edge of the hopper housing 14 by suitable fastners 39. The flange portion 38 of the funnel 17 is made of perforated material to facilitate the passage of air from the vents 7 as it flows outwardly.

The bin 2 for feeding the hopper 4 is an open topped member having the generally semi-circular support 18 at its lower end. This support 18 is fastened to the top flange 16 of the hopper housing 14 as illustrated in FIGS. 1 and 3. The conveyor 5 comprises end rollers 40 and 41 mounted on suitable support members 42 to position the conveyor 5 so that it carries the rings 3 from a loose pile within the bin 2 to the hopper funnel 17. The conveyor motor 13 which is coupled by a suitable belt 43 is controlled by a photo electric sensing system. The light source 44 and pick-up 45 are mounted on opposite sides of the hopper 4 so that the beam 46 is interrupted when a sufficient number of rings 3 are within the funnel. The interrupted beam turns off the motor 13 in the usual manner and reactivates the motor 13 when sufficient rings have been fed to unblock the beam 46.

Figure 2:
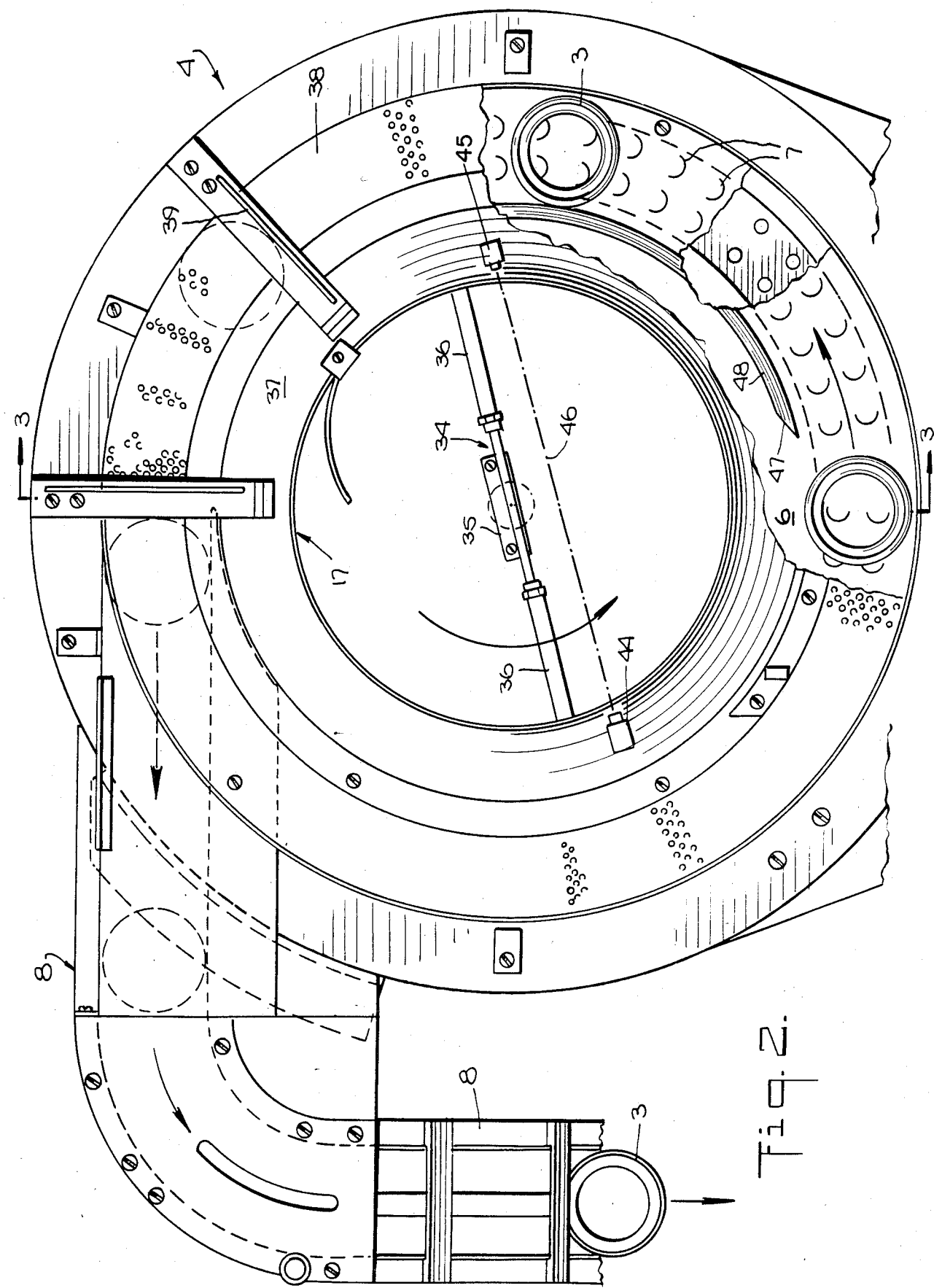
FIG. 2 is a top plan view of the hopper of FIG. 1.

The hopper funnel 17 flares inwardly above the rotating disc 6 so that it aids in directing the rings 3 onto the outer portion of the disc 6 adjacent to the air nozzles 7. This is illustrated by the ring $3^1$ shown at the lower edge of the funnel 17 in FIG. 3. The flaring funnel surface 17 tilts the ring $3^1$ thereby urging it to slide downwardly and outwardly to the nozzles 7 through the slot 47 in the cap guide ring 48 (FIG. 2).

It will be seen that an improved feed hopper has been provided which is particularly suited for feeding nonmagnetic articles as well as articles which may not be handled using a vacuum feed means. The improved feed hopper is relatively simple and effective and is capable of forming its article feeding operation at sufficient high speed for use of a wide variety of manufacturing systems including those used in the manufacturing of composite closure caps and similar items.

As various changes may be made in the form, construction and arrangement of the parts herein without departing from the spirit and scope of the invention and without sacrificing any of its advantage, it is to be understood that all matter herein is to be interpreted as illustrative and not in a limiting sense.

Having thus disclosed our invention, we claim:

1. A hoppering apparatus for feeding rings with depending skirt portions comprising the combination of a hopper including a support disc for engaging a plurality of the rings, means for rotating said support disc for carrying the rings to an exit chute, and air nozzles in said disc for directing streams of air under pressure generally circumferentially and in the direction of disc rotation and against the skirt portions of said rings for carrying the rings to said exit chute.

2. The hoppering apparatus as claimed in claim 1 in which said air nozzles are arranged in a circular zone around the outer portion of said disc.

3. The hoppering apparatus as claimed in claim 1 which further comprises an article feed bin having an outlet above said hopper and a conveyor for carrying articles to said outlet.

4. The hoppering apparatus as claimed in claim 3 which further comprises a control means for said conveyor activated by the articles in said hopper.

5. The hoppering apparatus as claimed in claim 4 in which said control means includes a photo electric means.

6. The hoppering apparatus as claimed in claim 3 which further comprises a funnel positioned on said hopper and at the bin outlet and having inwardly flared guide surface to direct articles toward the air nozzles on said disc.

* * * * *